P. THIBODEAU.
PIPE JACK.
APPLICATION FILED JULY 15, 1909.

968,096.

Patented Aug. 23, 1910.

WITNESSES:
H. L. Sprague
Harry W. Bowen.

INVENTOR.
Peter Thibodeau.
BY Chapin &co.
ATTORNEYS.

UNITED STATES PATENT OFFICE.

PETER THIBODEAU, OF WILLIMANSETT, MASSACHUSETTS, ASSIGNOR OF ONE-THIRD TO FRANK A. RIVERS, OF HOLYOKE, MASSACHUSETTS, AND ONE-THIRD TO DAVID H. YOUNG, OF WILLIMANSETT, MASSACHUSETTS.

PIPE-JACK.

968,096.      Specification of Letters Patent.      Patented Aug. 23, 1910.

Application filed July 15, 1909. Serial No. 507,730.

*To all whom it may concern:*

Be it known that I, PETER THIBODEAU, a subject of the Kingdom of Great Britain, residing at Willimansett, in the county of Hampden and State of Massachusetts, have invented new and useful Improvements in Pipe-Jacks, of which the following is a specification.

This invention relates to improvements in pipe-jacks and is particularly designed to be used in connection with the laying of sewer-pipes of large dimensions, especially in trenches that are very deep where it is almost impossible to properly aline one pipe with the succeeding one during the operation of inserting the filling or packing material.

It has been found in practice that the usual mode of supporting a length of pipe by means of a derrick is very crude and unsatisfactory, since when the spigot portion of the pipe is inserted in the bell or flange portion of the preceding pipe, the edges are very apt to strike, involving breakage; or the alinement is not properly maintained when the two lengths of pipe are placed together.

My present invention comprises, broadly, a member provided with a base portion, and a foot or cap member connected thereto, and means for moving one member relative to the other for clamping or retaining the jack in place.

The jack, as a whole, is adapted to be inserted within the pipe, near the bell portion thereof, the cap element being designed to receive and temporarily support the spigot portion of a pipe, and thus afford means for properly alining this part of the pipe when it is inserted in the bell portion after the packing of hemp or other material has been placed in the bell or flange portion.

Figure 1:
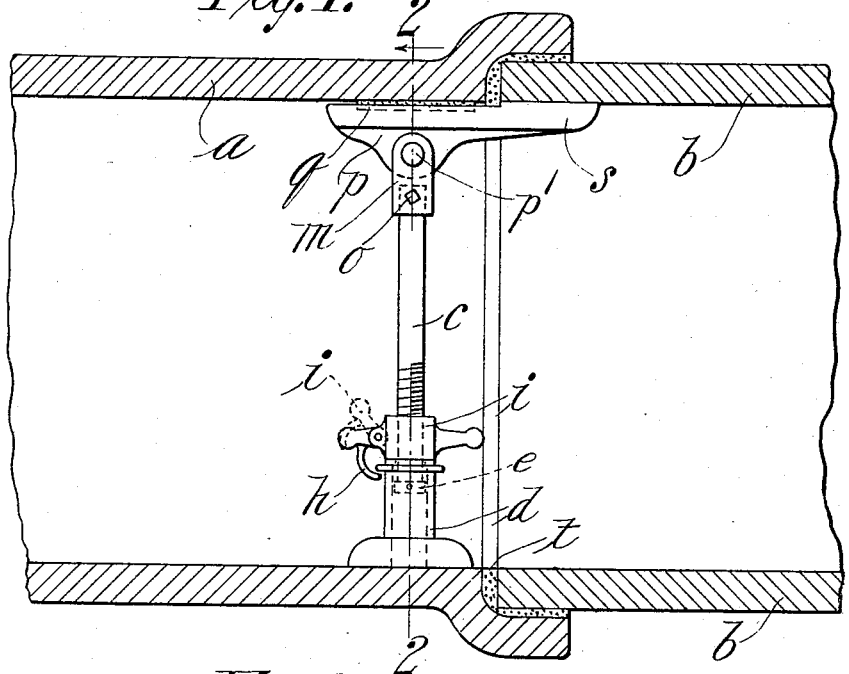
Figure 2:
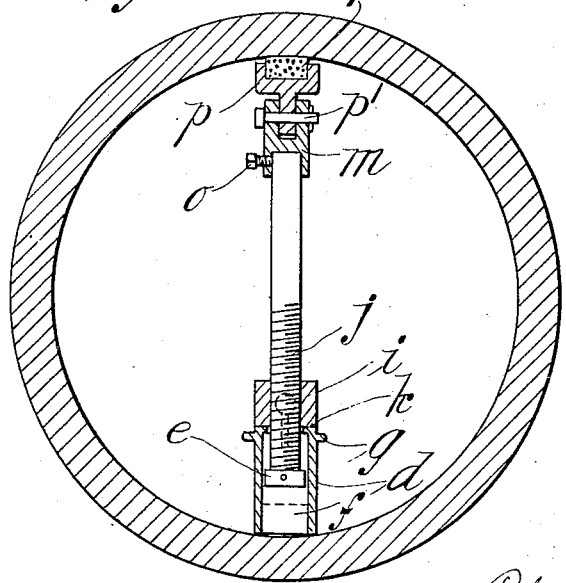

In the drawings forming part of this application,—Figure 1 shows a longitudinal sectional view, through the meeting ends of two lengths of sewer pipe, with my improvement shown in place after the spigot has been inserted in the bell portion. Fig. 2 is a transverse sectional view on the line 2—2, Fig. 1.

Referring to the drawings in detail: $a$ designates one of the lengths, and $b$ a succeeding length of pipe.

Referring to the construction of the jack in particular, $c$ designates a rod, the lower end of which is movably fitted into the base member $d$, and is provided with a sleeve or ring $e$ which slides freely in the opening $f$ of the base member $d$, which is provided with an annular flange $g$ for receiving a hook $h$ which is pivotally connected to the tightening nut $i$ at $i^1$. This nut engages the threaded portion $j$ of the rod $c$ and bears against the upper end $k$ of the member $d$.

The upper end of the rod $c$ has attached thereto a coupling $m$ by means of a set-nut $o$. This coupling pivotally supports a cap-piece $p$ at $p^1$, and is provided with a recessed portion $q$ in the upper ends thereof, in which is inserted a rubber or other packing $r$ so as to afford a cushion or pad against which the inner surface of the pipe $a$ rests, as shown. The cap-piece $p$ is provided with an outwardly extending arm portion or part $s$ for receiving and supporting the spigot part of the pipe $b$.

The mode or manner in which my improvement is used is as follows: The jack, as a whole, is inserted in the pipe $a$, near the bell portion thereof, so that the arm portion $s$ extends beyond the outer end of the bell, as shown, the jack being clamped in the pipe $a$ by rotating the nut $i$ which causes the base member $d$ and the cap-piece $p$ to be tightly secured within the pipe $a$ which has been previously placed in a fixed position. The spigot portion of the succeeding pipe $b$ is then placed on the outwardly extending end portion $s$ and temporarily supported thereon while the workman inserts the packing material $t$ in the bell of the pipe $a$. It will readily be seen that this arm portion $s$ affords a very accurate and safe means for temporarily retaining the portion of the pipe $b$, during the insertion of the packing material, and accurately alines the spigot with the bell. After the packing material is in place, it is a very easy matter to slide the pipe $b$ on the arm $s$ into its place in the bell portion of the preceding pipe, as readily understood. After this operation has been completed, the operator removes the jack by rotating the nut $i$ so as to loosen its grip on the inner surface of the pipe $a$, at the same time he is careful during the removal to see that the hook $h$ is under the ring $g$; otherwise, the base portion $d$ would slide on the rod $c$.

It will therefore be seen that I have provided a very simple and convenient pipe-jack by means of which the cost of building a line of sewer or other pipe is very much reduced, since this affords a convenient and accurate means of temporarily supporting a length of pipe while the packing *t* is being placed in the bell, and accurate means for inserting the spigot of the pipe into the bell after the packing is in place.

What I claim, is:—

1. A pipe-jack for the purpose described, comprising a rod threaded at one end, a base-piece, a nut engaging the threaded portion of the rod and the upper edge of the base-piece, a cap-member having an extended portion pivotally connected to the other end of the rod, an annular ring integral with the base-member, and a hook connected to the nut for engaging the said ring, as described.

2. A pipe-jack having in combination with a member threaded at one end, a base-piece for receiving said threaded end and provided with a ring portion, a nut on the threaded end engaging the upper portion of the base-piece, a hook pivoted to the nut and adapted to engage the ring, the opposite end of the threaded member having a cap member pivoted thereto and provided with an extended portion which projects a greater distance from one side of the axis of the threaded member than from the other side, whereby a length of pipe may be supported and moved axially toward the bell-shaped portion of a fixed length when the jack is secured in the fixed length near its open or bell-shaped end with the extended portion of the cap projecting beyond the margin of the bell-shaped portion, substantially as described.

PETER THIBODEAU.

Witnesses:
 EUGENE DESAULNIERS,
 MATTHEW M. MAHONEY.